US012425420B2

(12) United States Patent
Liu et al.

(10) Patent No.: US 12,425,420 B2
(45) Date of Patent: Sep. 23, 2025

(54) METHOD AND SYSTEM FOR ANOMALY DETECTION IN A NETWORK

(71) Applicant: Siemens Aktiengesellschaft, Munich (DE)

(72) Inventors: Yushan Liu, Munich (DE); Mitchell Joblin, Surrey (CA); Marcel Hildebrandt, Munich (DE); Dominik Dold, Leiden (NL)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 148 days.

(21) Appl. No.: 18/138,197

(22) Filed: Apr. 24, 2023

(65) Prior Publication Data
US 2023/0353584 A1  Nov. 2, 2023

(30) Foreign Application Priority Data
Apr. 28, 2022 (EP) .................................... 22170611

(51) Int. Cl.
*H04L 9/40* (2022.01)
(52) U.S. Cl.
CPC ................ *H04L 63/1416* (2013.01)
(58) Field of Classification Search
CPC . H04L 63/0227; H04L 63/1441; H04L 63/20; H04L 63/1408; H04L 63/1416; G06N 5/025; G06F 21/566

(Continued)

(56) References Cited

U.S. PATENT DOCUMENTS 8,997,057 B1 * 3/2015 Diwan ................ G06F 11/3409
717/124
10,154,047 B2 * 12/2018 Muddu .................. G06N 20/00
(Continued)

FOREIGN PATENT DOCUMENTS

WO    2020014181 A1    1/2020

OTHER PUBLICATIONS

Soler Garrido, Josep et al: "Machine learning on knowledge graphs for context-aware security monitoring"; arxiv.org, Cornell University Library; XP081965354; 2021.
(Continued)

*Primary Examiner* — Amare F Tabor
(74) *Attorney, Agent, or Firm* — Schmeiser, Olsen & Watts LLP (57) ABSTRACT

For anomaly detection in a network, a temporal knowledge graph represents the network including interactions between network modules with a set of entities, a set of relations, and a set of timestamps. In a first step, temporal random walks are sampled from the temporal knowledge graph. These are transformed in a second step into temporal logical rules. After observing an event in the network—or in a different network—the observed event is classified in a third step regarding an anomaly, using the temporal logical rules. The temporal knowledge graph is used as a stream-based data structure to extract rules that identify typical temporal behavior of the network and is used to identify anomalies in a human-interpretable way. The anomaly detection task is framed as a quadruple classification problem, using the temporal logical rules and their respective groundings in the temporal knowledge graph to support the classification.

13 Claims, 3 Drawing Sheets (58) Field of Classification Search
USPC .......................................................... 726/23
See application file for complete search history.

(56) References Cited

U.S. PATENT DOCUMENTS

| | | | |
|---|---|---|---|
| 10,305,917 B2 * | 5/2019 | Chen ....................... | H04L 63/14 |
| 11,973,777 B2 * | 4/2024 | Pi .......................... | H04L 41/064 |
| 2015/0052090 A1 * | 2/2015 | Lin .......................... | G06N 7/01 |
| | | | 706/12 |
| 2016/0330226 A1 | 11/2016 | Chen et al. | |
| 2017/0235626 A1 * | 8/2017 | Zhang ................. | G06F 11/3452 |
| | | | 714/26 |
| 2022/0014560 A1 * | 1/2022 | Crabtree ................ | H04L 63/20 |

OTHER PUBLICATIONS

L. Zheng et al., "AddGraph: Anomaly Detection in Dynamic Graph Using Attention-based Temporal GCN"; Proceedings of the Twenty-Eighth International Joint Conference on Artificial Intelligence, IJCAI-19; International Joint Conferences on Artificial Intelligence Organization, Jul. 2019; 2019.

* cited by examiner

METHOD AND SYSTEM FOR ANOMALY DETECTION IN A NETWORK

CROSS-REFERENCE TO RELATED APPLICATIONS

This application claims priority to EP Application No. 22170611.2, having a filing date of Apr. 28, 2022, the entire contents of which are hereby incorporated by reference.

FIELD OF TECHNOLOGY

The following relates to a method and system for anomaly detection in a network.

BACKGROUND

Operational technology (OT) systems, such as those used in traditional factories, have typically been extremely deterministic in their operation—and their security has been at least partially implemented by the means of isolation. However, modern industry 4.0 manufacturing systems are characterized by a convergence of information technology (IT) and OT infrastructure, displaying increasingly complex activity patterns and network topologies and making extensive use of autonomous systems and components (e.g., robots or AI-enabled software applications) that constantly interact with one another. This new paradigm has the potential to substantially improve the flexibility, reliability, and efficiency of manufacturing but also poses new cybersecurity challenges and demands a high degree of domain-specific knowledge from analysts assessing potential integrity issues or indications of security compromises.

Most commercial software requires establishing a baseline behavior by configuring the network and letting it run without any security events for a period of time. Then, it measures deviations from the baseline behavior. A drawback is that is does not deal well with topology changes and also requires baselining activities beforehand.

Traditional methods for anomaly detection in the cybersecurity domain mostly focus on separate data streams (e.g., only network events) and often suffer from producing an unmanageable number of alerts (of which the majority are false positives) that are hard to interpret for human security analysts.

J. Soler Garrido, D. Dold, and J. Frank, "Machine learning on knowledge graphs for context-aware security monitoring," IEEE International Conference on Cyber Security and Resilience (IEEE-CSR), 2021, tries to remedy these downsides by rephrasing anomaly detection as a link prediction task in knowledge graphs, i.e., by modeling the system to be monitored as a knowledge graph and using graph-based machine learning algorithms to evaluate the plausibility of new edges (representing previously unseen system events) in the graph representation of the system.

L. Zheng et al., "AddGraph: Anomaly Detection in Dynamic Graph Using Attention-based Temporal GCN", Proceedings of the Twenty-Eighth International Joint Conference on Artificial Intelligence, IJCAI-19. International Joint Conferences on Artificial Intelligence Organization, July 2019, discloses an anomaly detection method for dynamic graphs based on temporal Graph Convolutional Networks (GCNs) with attention-based Gated Recurrent Units (GRUs) that is capable of learning the temporal patterns of anomalies in a system.

SUMMARY

An aspect relates to provide an alternative to the state of the art.

According to the method for anomaly detection in a network, the following operations are performed by components, wherein the components are software components executed by one or more processors and/or hardware components:
representing, by a temporal knowledge graph stored in a graph database, a network including interactions between network modules with a set of entities, a set of relations, and a set of timestamps,
with each entity representing data about the network as a node in the temporal knowledge graph,
with at least some entities representing network modules consisting of hardware and/or software,
with at least some of the relations representing a type of interaction between network modules, and
with at least some edges between nodes representing interactions between entities that have been observed as events, with each of these edges having a timestamp, encoding when the interaction occurred, and being an instance of one of the relations,
sampling, by a temporal random walks component in a first step, temporal random walks from the temporal knowledge graph for each relation in the temporal knowledge graph, wherein each temporal random walk is a sequence of edges with decreasing timestamps starting with an edge for the respective relation,
transforming, in a second step, the temporal random walks into temporal logical rules,
observing, by a monitoring component, an event in the network or a different network, and
classifying, in a third step, the observed event with regard to an anomaly, using the temporal logical rules.

The system for anomaly detection in a network comprises the following components:
a graph database storing a temporal knowledge graph representing a network including interactions between network modules with a set of entities, a set of relations, and a set of timestamps,
with each entity representing data about the network as a node in the temporal knowledge graph,
with at least some entities representing network modules consisting of hardware and/or software,
with at least some of the relations representing a type of interaction between network modules, and
with at least some edges between nodes representing interactions between entities that have been observed as events, with each of these edges having a timestamp, encoding when the interaction occurred, and being an instance of one of the relations,
a temporal random walks component configured for sampling temporal random walks from the temporal knowledge graph for each relation in the temporal knowledge graph, wherein each temporal random walk is a sequence of edges with decreasing timestamps starting with an edge for the respective relation,
a rule learning component configured for transforming the temporal random walks into temporal logical rules,
a monitoring component, configured for observing an event in the network or a different network, and
a rule matching component, configured for classifying the observed event with regard to an anomaly, using the temporal logical rules.

The graph database can be stored in RAM, on a hard disk or on a solid-state drive, for example. The graph database can be implemented by simply storing a set of datasets, or by any other kind of database, for example a relational database or a dedicated graph database.

In connection with embodiments of the invention, unless otherwise stated in the description, the terms "training", "generating", "computer-aided", "calculating", "determining", "reasoning", "retraining" and the like relate to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smartphones, devices or any other communication devices that can process data with computer support, processors and other electronic devices for data processing. Computers can in particular comprise one or more processors and memory units.

In connection with embodiments of the invention, a "memory", "memory unit" or "memory module" and the like can mean, for example, a volatile memory in the form of random-access memory (RAM) or a permanent memory such as a hard disk or a Disk.

The temporal knowledge graph is used as a stream-based data structure to extract rules that identify typical temporal behavior of the network and can be used to identify anomalies in a human-interpretable way.

The method and system, or at least some of their embodiments, frame the anomaly detection task as a quadruple classification problem, using the temporal logical rules and their respective groundings in the temporal knowledge graph to support the classification.

The method and system, or at least some of their embodiments, use a scalable rule-based quadruple classification framework for interpretable prediction.

Existing approaches that rephrase anomaly detection as a link prediction task in knowledge graphs only focus on static knowledge graph methods and are not suitable to capture the temporal dependencies that arise from complex activity streams in modern manufacturing systems.

On the other hand, graph-based algorithms that rely on embeddings do not provide human-interpretable explanations of the output.

The method and system, or at least some of their embodiments, provide with the temporal logical rules comprehensible and—for human analysts interpretable—features that can help analysts identify the problems. Moreover, the learned temporal logical rules can be transferred to a new network setup if the underlying data model is consistent so that it is not necessary to learn the rules from scratch.

Different to previous methods, the method and system, or at least some of their embodiments, extract human-interpretable heuristic rules that—depending on the training procedure and application—describe the typical behavior of network modules that can be used to detect and analyze network anomalies (or uncover temporal patterns of anomalies, which can have multiple stages over an extended period of time, like scanning the network over an extended period of time, followed by migration of the applications and stealing of credentials). The temporal logical rules and corresponding paths (rule groundings) in the temporal knowledge graph serve as human-interpretable explanations so that the domain expert can understand the predictions and act accordingly.

Moreover, in contrast to embedding-based approaches for knowledge graphs that could be applied in the context of cybersecurity, at least some of the embodiments can operate in an inductive setting. That means the temporal logical rules that are extracted from one knowledge graph can be employed on another knowledge graph (i.e., with other entities but the same relations, i.e. interaction types) without having to retrain the learning model. Especially for new networks, no baselining of activities is needed as in existing software. Compared with approaches that integrate manually defined rules by domain experts, at least some of the embodiments do not need explicit background information and are better scalable to large datasets, resulting in reduced time and effort to construct the rules.

In another embodiment of the method and system, the second step is performed by a rule learning component, wherein each temporal logical rule consists of a rule body and a rule head, with each rule head specifying one of the relations, each temporal random walk is stored as a rule grounding of the respective temporal logical rule, and a confidence value is computed for each temporal logical rule, indicating a probability for the correctness of the respective rule.

In another embodiment of the method and system, the sequence of edges of each temporal random walk is transformed into a temporal logical rule by replacing the entities and the timestamps in the sequence of edges by variables, forming the rule head based on the first edge in the sequence of edges, and forming the rule body by reordering the remaining sequence of edges.

In another embodiment of the method and system, the observed event is represented with a query containing a query subject, a query relation, a query object, and a query timestamp. The third step is performed by a rule matching component, taking as input the query, the temporal knowledge graph and the temporal logical rules with the confidence values, and computing a classification score based on matching rules among the temporal logical rules, wherein the matching rules predict the observed event, and wherein the classification score indicates a probability to observe the observed event.

In another embodiment of the method and system, the third step consists of retrieving temporal random walks in the temporal knowledge graph between the query subject and query object, determining the matching rules by picking temporal logical rules if the query relation matches the relation specified in the rule head and one of the retrieved walks matches the rule body, and calculating the classification score based on the confidence values of the matching rules.

In another embodiment of the method and system, the observed event is classified with regard to a set of classes based on the classification score, with at least one of the classes indicating an anomaly.

An embodiment of the method and system comprises an additional fourth step of outputting, by an explainable prediction component and a user interface, the result of the classification and the rule groundings for the matching rules to a user.

This embodiment provides the rule groundings as a human-understandable explanation for the classification result to the user.

In another embodiment of the method and system, the result of the classification and the rule groundings are transformed into natural language output.

An embodiment of the method and system comprises the additional step of automatically disconnecting at least one network module from the network or limiting its connections on certain ports, based on the classification result.

In another embodiment of the method and system, the network is an industrial automation system, in particular a manufacturing system.

In another embodiment of the system, the system is implemented as a monitoring device, in particular an edge device, wherein the monitoring device is part of the network, and the network is an industrial automation system, in particular a manufacturing system.

The computer program product (non-transitory computer readable storage medium having instructions, which when executed by a processor, perform actions) has program instructions for carrying out the method.

The provision device stores and/or provides the computer program product.

BRIEF DESCRIPTION

Some of the embodiments will be described in detail, with reference to the following figures, wherein like designations denote like members, wherein.

DETAILED DESCRIPTION

In the following description, various aspects of embodiments of the present invention and embodiments thereof will be described. However, it will be understood by those skilled in the art that embodiments may be practiced with only some or all aspects thereof. For purposes of explanation, specific numbers and configurations are set forth in order to provide a thorough understanding. However, it will also be apparent to those skilled in the art that the embodiments may be practiced without these specific details.

The described components can each be hardware components or software components. For example, a software component can be a software module such as a software library; an individual procedure, subroutine, or function; or, depending on the programming paradigm, any other portion of software code that implements the function of the software component. A combination of hardware components and software components can occur, in particular, if some of the effects according to embodiments of the invention are exclusively implemented by special hardware (e.g., a processor in the form of an ASIC or FPGA) and some other part by software.

Figure 1:
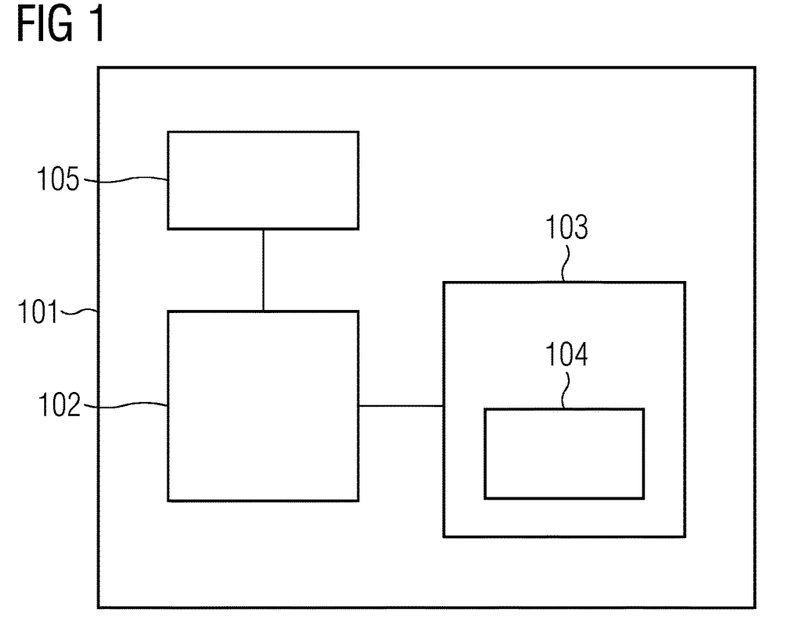
FIG. 1 shows a first embodiment.

FIG. 1 shows one sample structure for computer-implementation of embodiments of the invention which comprises:
(101) computer system
(102) processor
(103) memory
(104) computer program (product)
(105) user interface In this embodiment of the invention the computer program product 104 comprises program instructions for carrying out embodiments of the invention. The computer program 104 is stored in the memory 103 which renders, among others, the memory 103 and/or its related computer system 101 a provisioning device for the computer program product 104. The system 101 may carry out embodiments of the invention by executing the program instructions of the computer program 104 by the processor 102. Results of embodiments of the invention may be presented on the user interface 105. Alternatively, they may be stored in the memory 103 or on another suitable means for storing data.

Figure 2:
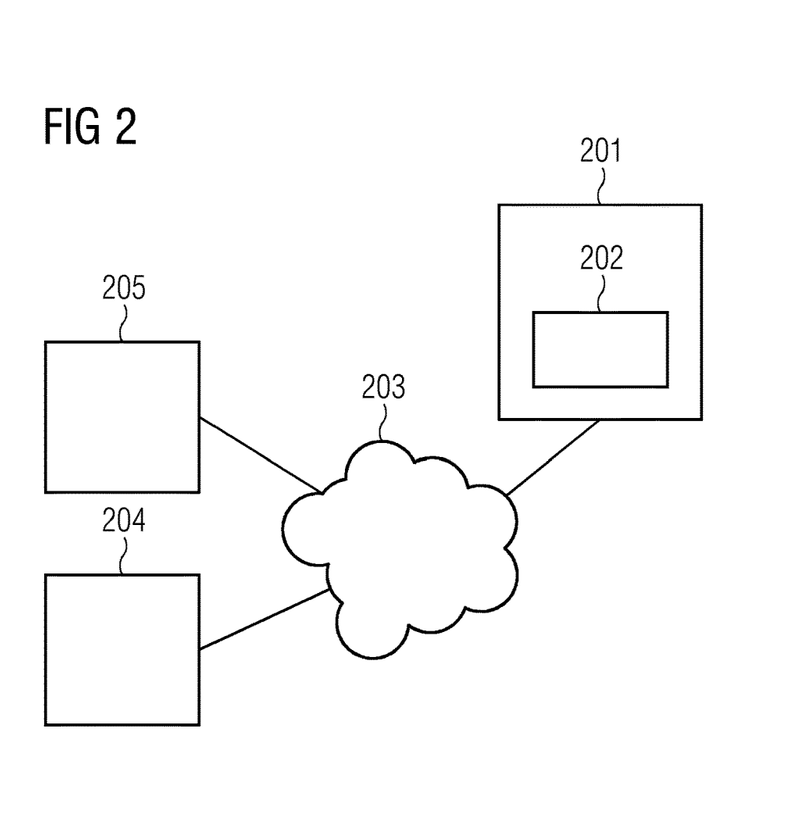
FIG. 2 shows another embodiment.

FIG. 2 shows another sample structure for computer-implementation of embodiments of the invention which comprises:
(201) provisioning device
(202) computer program (product)
(203) computer network/Internet
(204) computer system
(205) mobile device/smartphone In this embodiment the provisioning device 201 stores a computer program 202 which comprises program instructions for carrying out embodiments of the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

Figure 4:
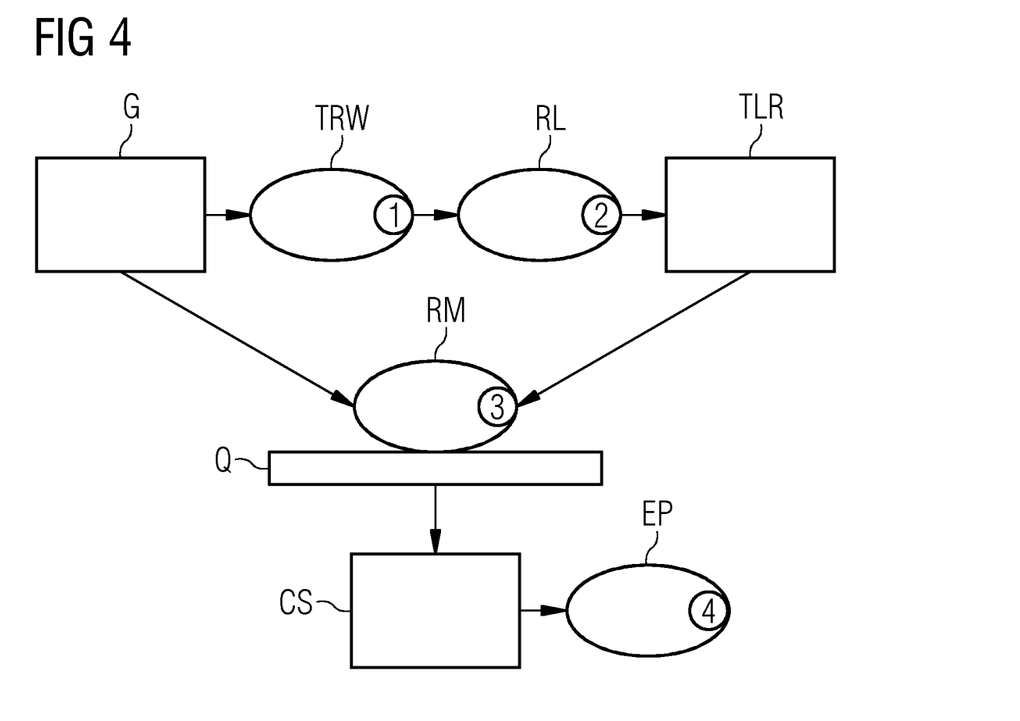
FIG. 4 shows an anomaly detection framework.
Figure 5:
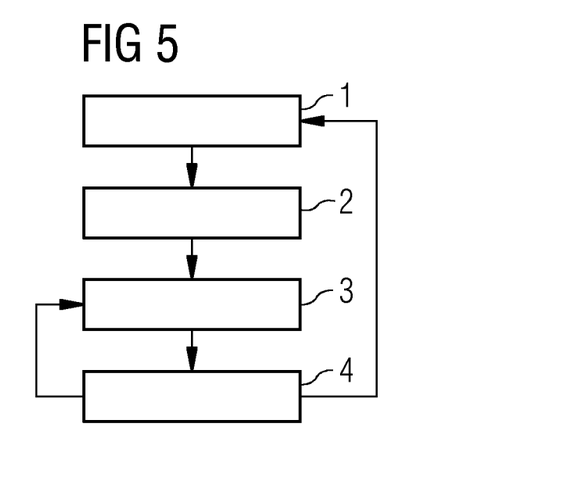
FIG. 5 shows a flowchart of a possible exemplary embodiment of a method for monitoring a network.

The embodiments shown in FIGS. 4 and 5 can be implemented with a structure as shown in FIG. 1 or FIG. 2.

Figure 3:
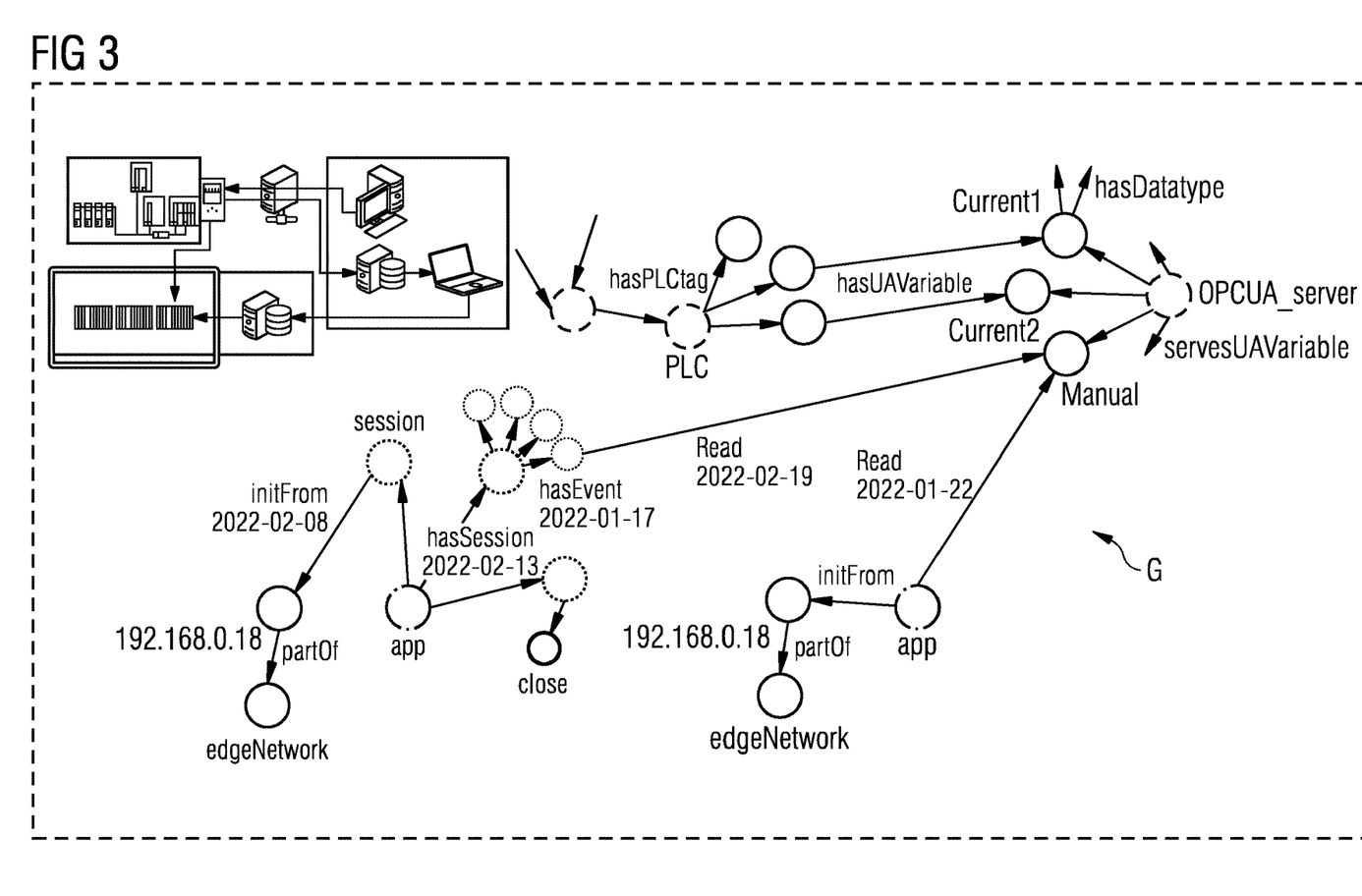
FIG. 3 shows an example of a cyber-physical system and its representation as a knowledge graph with dynamic edges.

FIG. 3 shows an example of a network, here a cyber-physical system and its representation as a temporal knowledge graph G with dynamic edges. The cyber-physical system is, for example, a modern industry 4.0 manufacturing systems, or any other kind of industrial automation system. In the following, the cyber-physical system will be simply referred to as "network". However, the term "network" shall also include any other kind of computer network, as the embodiments can be applied to any kind of (computer) network, including industrial automation systems, intranets, etc.

The embodiments shown in FIGS. 4 and 5 consist of a rule-based method that monitors a network, for example a modern manufacturing system, and detects potentially malicious activities so that automated actions can be made based on the outputs. For these embodiments, the network is first represented as a dynamic (temporal) knowledge graph as depicted in FIG. 3, i.e., modules of the network (like servers, applications, hardware modules, system settings, and properties like IP addresses) are represented as nodes, while interactions between modules (e.g., network events) are represented as edges between nodes that are flagged with a timestamp—encoding when the interaction occurred. This representation allows a seamless and context-conserving integration of data from different domains like engineering data and network data. The stream-based temporal knowledge graph G is then used to extract rules that identify typical temporal behavior of the network and can be used to identify anomalies in a human-interpretable way.

A hallmark of the embodiment is that extracted temporal logical rules capture behavioral patterns of the network. This is quite important since whether an action (or setting) of a network module is suspicious or expected often depends on the prior behavior of the module (and other modules), i.e., the prior and current state of the network that precedes with this action (or setting).

For instance, a software application hosted on an edge computer (i.e., situated in a factory and used to, e.g., automate or optimize production) might exhibit different patterns of reading data (variables) from sensors in a manufacturing system, where—depending on the calculation the application is currently doing—different variables are read from the manufacturing system in a certain order. An application might have several of these patterns (with variations thereof), where the validity of data accesses depends on what the application has accessed in the network beforehand.

Another example is network connections where certain connectivity patterns might occur in the network (a module with IP address IPi accesses always IP3 after accessing IP2) or certain co-occurrences/patterns of network connections (e.g., high data volumes are only observed over a specific port or download from one IP is always followed by an upload to another IP).

The embodiment allows to automatically capture such dynamic behavior of the network and trigger automated actions based on the output. For example, if the algorithm finds that a network device is acting maliciously, then it can be taken offline or limited in its connections on certain ports to mitigate damage until a human can look further into it.

The following embodiments take a temporal knowledge graph G, for example like the one shown in FIG. 3, as input and learn temporal logical rules by extracting temporal random walks from the graph for anomaly detection. The anomaly detection task is framed as a quadruple classification problem and temporal logical rules and respective groundings in the temporal knowledge graph are used to support the classification.

FIG. 4 shows an embodiment of the method and system in the form of an anomaly detection framework.

The data about the network modules and their interactions are multi-relational and represented by a temporal knowledge graph $G \subseteq V \times R \times V \times T$, where V denotes the set of entities (e.g., servers, applications), R the set of relations (e.g., reads, accesses), and T the set of timestamps (e.g., 2019-12-10; 11:10). A link or edge is represented by a quadruple (subject, relation, object, timestamp) $\in$ G, where the granularity of the timestamps could be hours, minutes, or any other reasonable unit. A quadruple stands for an observed event in the network.

The anomaly detection task can be formulated as a quadruple classification problem on the temporal knowledge graph G, where the context (i.e., the graph neighborhood) and history of entities serve as features. Concretely, the task is to classify an edge (corresponding to an event) in the temporal knowledge graph G as one of the classes such as "expected", "unexpected", "suspicious", and "highly suspicious".

The embodiments use a scalable rule-based quadruple classification framework for interpretable prediction that first extracts temporal random walks from the temporal knowledge graph G and then transforms these walks to temporal logical rules TLR that generalize to new data points. For a query Q in the form of a query quadruple (subject, relation, object, timestamp), the learned temporal logical rules TLR are matched with the neighborhood of the subject and object, and a classification score CS is calculated depending on the rule groundings in the temporal knowledge graph G. The rule groundings also serve as explicit, human-interpretable explanations for the prediction. More precisely, the framework consists of the following four components as shown in FIG. 4:

- a temporal random walks component TRW performing a first step 1,
- a rule learning component RL performing a second step 2,
- a rule matching component RM performing a third step 3, and
- an explainable prediction component EP performing a fourth step 4.

Temporal random walks component TRW

This component takes as input the temporal knowledge graph G, containing information about the network modules and interactions (observed events) in the network.

The output of this component are temporal random walks.

Given information about the network and observed events in form of the temporal knowledge graph G, temporal random walks are extracted by the temporal random walks component TRC. Starting with an edge $(x_1, h, x_{n+1}, t_{n+1})$ for a fixed relation $h \in R$, a random walker samples adjacent edges iteratively until a walk of length n+1 is obtained. The sampling distribution could either be uniform or exponentially distributed with respect to the timestamps (e.g., to favor events that are close to the previous event). Thereby, the embodiment imposes the constraint that the timestamps in the sequence of sampled edges should be decreasing, i.e., we are going backward in time. In the last step n+1, an edge is sampled that connects to the first entity $x_1$ of the walk if such an edge exists. For all relations in the graph, a fixed number of temporal random walks is sampled.

The resulting temporal random walk is a sequence of edges $$((x_1, h, x_{n+1}, t_{n+1}), (x_{n+1}, b_n, x_n, t_n), \ldots, (x_2, b_1, x_1, t_1)),$$

where $t_{n+1} > t_n > \ldots > t_1$.

Rule learning component RL

This component takes as input the temporal random walks that have been computed by the temporal random walks component TRW.

The output of this component are temporal logical rules TLR with confidence values.

Given a temporal random walk of the form $$((x_1, h, x_{n+1}, t_{n+1}), (x_{n+1}, b_n, x_n, t_n), \ldots, (x_2, b_1, x_1, t_1)), \quad (1)$$

a temporal logical rule TLR $$(X_1, h, X_{n+1}, T_{n+1}) \rightarrow (X_1, b_1^{-1}, X_2, T_1) \land (X_2, b_2^{-1}, X_3, T_2) \land \ldots \land (X_n, b_n^{-1}, X_{n+1}, T_n) \quad (2)$$

is created by reordering the edges and replacing the entities and timestamps by variables. $(X_1, h, X_{n+1}, T_{n+1})$ is referred to as the rule head and $(X_1, b_1^{-1}, X_2, T_1) \land (X_2, b_2^{-1}, X_3, T_2) \land \ldots \land (X_n, b_n^{-1}, X_{n+1}, T_n)$ as the rule body. The rule body consists of a conjunction of body atoms. Here, $b_i^{-1}$ represents the inverse of relation $b_i$ (the inverse of the event $(x_1, b_i, x_2, t)$ is $(x_2, b_i^{-1}, x_1, t)$). The temporal random walk (1) is called a grounding of the temporal logical rule (2). A temporal logical rule implies that if the rule body holds with $T_1 < \ldots < T_n$, then the rule head holds as well for a future timestamp $T_{n+1} > T_n$. Since there are rarely rules that are always true, the rule learning component RL estimates for each temporal logical rule TLR a confidence value, i.e., a probability for the rule's correctness, as will be described in the following.

The rule learning component RL uses a standard confidence $$\frac{\text{rule support}}{\text{body support}},$$

where it adapts the body support and rule support to account for different timestamp value combinations. The confidence value of each temporal logical rule TLR is computed by dividing the rule support by the body support. The rule support and the body support will be defined in the following paragraph.

Let "rule grounding" refer to the replacement of the variables in the entire rule and "body grounding" refer to the replacement of the variables only in the body. Then, the body support for a rule is defined as the number of body groundings in the the temporal knowledge graph, and the rule support is defined as the number of body groundings such that at least one corresponding rule head exists in the the temporal knowledge graph. Since it is usually not computationally feasible to find all body groundings in the the temporal knowledge graph, the confidence is estimated by sampling a number of rule bodies (as body support) and counting the rule support.

Rule Matching Component RM

This component takes as input the temporal logical rules TLR with the confidence values that have been computed by the rule learning component RL, as well as the temporal knowledge graph G, and a query Q.

The output of this component is a classification score CS as well as rule groundings in the temporal knowledge graph G.

Given the query Q of the form (subject, relation, object, timestamp) representing a query event, e.g., (App A, accesses, Variable B, 2022-02-05; 12:18), the rule matching component RM retrieves all walks in the temporal knowledge graph G up to a specified length between the query subject and query object (or a subset of walks if retrieving all walks is not feasible). The rule matching component RM matches these walks to the rule bodies of the learned rules, in which the query relation appears in the rule head. After matching, the rule matching component RM obtains a list of matching rules (with their confidence values) that could be applied to predict the event given by the query Q. To calculate the classification score CS, which could be interpreted as the probability to observe the query event, the rule matching component RM combines the confidence values from the resulting matching rule list via a noisy- or aggregation. Instead of directly taking the confidence values, it is also possible to apply a more complex scoring function, e.g., a function that takes the explicit timestamp values into account. One possibility for a more complex scoring function is to combine the confidence values with an exponential function depending on the time difference $t_{n+1}(r_g)-t_1(r_g)$ of the rule grounding $r_g$ for a rule r:

$$f(r)=\text{confidence}(r)+\exp(-\lambda(t_{n+1}(r_g)-t_1(r_g))).$$

The main idea is that events that are supported by matching rules with high confidence values are more likely to happen and events that are only supported by few matching rules or matching rules with low confidence values are more likely to be an anomaly.

Depending on the classification score CS and either predefined or learned thresholds, the query event is classified as one of the classes, e.g., a score of ≥0.9 indicates that the event is expected and a score of ≤0.1 implies that the event is highly suspicious. In this case, either (predefined) automated actions can be taken, or actions could be derived from the algorithm's output for further human investigation.

Explainable Prediction Component EP

This component takes as input the classification score CS computed by the rule matching component RM as well as the rule groundings for the matching rules in the temporal knowledge graph G.

The output of this component is a human-understandable explanation for the predictions.

The classification score CS on the one hand, and as its human-understandable explanation, the matching rules along with their rule groundings (corresponding paths) in the temporal knowledge graph G on the other hand, are displayed to the human operator. The matching rules and the rule groundings should be presented in a human-readable fashion (verbalization in natural language) so that the human can understand the reason for the predictions. The explanations could support the human operator in deciding the next action steps, and the matching rules provide hints what could be the cause of the anomaly.

FIG. 5 shows a flowchart illustrating an embodiment of the method.

In a first step 1, the temporal random walks component TRW takes as input the temporal knowledge graph G, containing information about the network modules and interactions (observed events) in the network, and computes as output temporal random walks.

In a second step 2, the rule learning component RL takes as input the temporal random walks that have been computed by the temporal random walks component TRW and computes as output the temporal logical rules TLR with confidence values.

In a third step 3, the rule matching component RM takes as input the temporal logical rules TLR with the confidence values that have been computed by the rule learning component RL, as well as the temporal knowledge graph G, and the query Q.

The rule matching component RM computes as output the classification score CS as well as rule groundings for matching rules in the temporal knowledge graph G.

In a fourth step 4, the explainable prediction component EP takes as input the classification score CS computed by the rule matching component RM as well as the rule groundings for the matching rules in the temporal knowledge graph G.

The output of the explainable prediction component EP is a human-understandable explanation for the predictions.

During training, the temporal logical rules TLR are automatically learned with the first step 1 and the second step 2 from observed events in the network. Since new events happen continuously, it makes sense to update the rules and the confidence values of the rules on a regular basis to incorporate the new information. The learned temporal logical rules TLR are applied in the third step 3 in real-time for monitoring the network and detecting anomalies in a timely manner so that actions can be taken. The explainable predictions generated in the fourth step 4 are presented via a graphical user interface to the expert who can decide which operations to perform depending on the classification score CS and the explanations.

The temporal logical rules TLR learned by this embodiment could be used for the reconfiguration of an existing network or also be transferred to related networks, e.g., new network setups where not enough historical information exists. The temporal logical rules TLR can be transferred and applied directly if both networks fulfill certain conditions, e.g., share a common vocabulary.

For example, the method can be executed by one or more processors. Examples of processors include a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing, and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for anomaly detection in a network, comprising operations, wherein the operations are performed by components, and wherein the components are software components executed by one or more processors and/or hardware components, the method comprising:
   representing, by a temporal knowledge graph stored in a graph database, a network including interactions between network modules with a set of entities, a set of relations, and a set of timestamps,
      with each entity representing data about the network as a node in the temporal knowledge graph,
      with at least some entities representing network modules consisting of hardware and/or software,
      with at least some of the relations representing a type of interaction between network modules, and
      with at least some edges between nodes representing interactions between entities that have been observed as events, with each of these edges having a timestamp, encoding when the interaction occurred, and being an instance of one of the relations;
   sampling, by a temporal random walks component in a first step, temporal random walks from the temporal knowledge graph for each relation in the temporal knowledge graph, wherein each temporal random walk is a sequence of edges with decreasing timestamps starting with an edge for the respective relation;
   transforming, in a second step, the temporal random walks into temporal logical rules;
   observing, by a monitoring component, an event in the network or a different network; and
   classifying, in a third step, the observed event with regard to an anomaly, using the temporal logical rules;
   wherein the second step is performed by a rule learning component, wherein:
      each temporal logical rule consists of a rule body and a rule head, with each rule head specifying one of the relations,
      each temporal random walk is stored as a rule grounding of the respective temporal logical rule, and
      a confidence value is computed for each temporal logical rule, indicating a probability for the correctness of the respective rule.

2. The method of claim 1,
wherein the sequence of edges of each temporal random walk is transformed into a temporal logical rule by:
   replacing the entities and the timestamps in the sequence of edges by variables, forming the rule head based on the first edge in the sequence of edges, and forming the rule body by reordering the remaining sequence of edges.

3. The method of claim 1,
wherein the observed event is represented with a query containing a query subject, a query relation, a query object, and a query timestamp, and
wherein the third step is performed by a rule matching component,
   taking as input the query, the temporal knowledge graph and the temporal logical rules with the confidence values, and
   computing a classification score based on matching rules among the temporal logical rules, wherein the matching rules predict the observed event, and wherein the classification score indicates a probability to observe the observed event.

4. The method of claim 3,
wherein the third step includes:
   retrieving temporal random walks in the temporal knowledge graph between the query subject and query object,
   determining the matching rules by picking temporal logical rules if the query relation matches the relation specified in the rule head and one of the retrieved walks matches the rule body, and
   calculating the classification score based on the confidence values of the matching rules.

5. The method of claim 3,
wherein the observed event is classified with regard to a set of classes based on the classification score, with at least one of the classes indicating an anomaly.

6. The method of claim 5,
with an additional fourth step of outputting, by an explainable prediction component and a user interface, the result of the classification and the rule groundings for the matching rules to a user.

7. The method of claim 6,
wherein the result of the classification and the rule groundings are transformed into natural language output.

8. The method according to claim 1,
with the additional step of automatically disconnecting at least one network module from the network or limiting its connections on certain ports, based on the classification result.

9. The method according to claim 1,
wherein the network is an industrial automation system.

10. A system for anomaly detection in a network, comprising:
   a graph database storing a temporal knowledge graph representing a network including interactions between network modules with a set of entities, a set of relations, and a set of timestamps, with each entity representing data about the network as a node in the temporal knowledge graph, with at least some entities representing network modules consisting of hardware and/or software, with at least some of the relations representing a type of interaction between network modules, and with at least some edges between nodes representing interactions between entities that have been observed as events, with each of these edges having a timestamp, encoding when the interaction occurred, and being an instance of one of the relations;

a temporal random walks component configured for sampling temporal random walks from the temporal knowledge graph for each relation in the temporal knowledge graph, wherein each temporal random walk is a sequence of edges with decreasing timestamps starting with an edge for the respective relation;

a rule learning component configured for transforming the temporal random walks into temporal logical rules;

a monitoring component, configured for observing an event in the network or a different network; and a rule matching component, configured for classifying the observed event with regard to an anomaly, using the temporal logical rules;

wherein:

each temporal logical rule consists of a rule body and a rule head, with each rule head specifying one of the relations, each temporal random walk is stored as a rule grounding of the respective temporal logical rule, and a confidence value is computed for each temporal logical rule, indicating a probability for the correctness of the respective rule.

11. The system according to claim 10, implemented as a monitoring device, in particular an edge device, wherein the monitoring device is part of the network, and the network is an industrial automation system, in particular a manufacturing system.

12. A computer program product, comprising a computer readable hardware storage device having computer readable program code stored therein, said program code executable by a processor of a computer system to implement a method according to claim 1.

13. A provision device for the computer program product according to claim 12, wherein the provision device stores and/or provides the computer program product.

* * * * *